ATHLETIC SHOES

Original Filed April 30, 1969 2 Sheets-Sheet 1

United States Patent Office

Re. 27,512
Reissued Oct. 24, 1972

27,512
ATHLETIC SHOES

Kihachiro Onitsuka, 91–5, 1-chome, Kitano-cho, Ikuta-ku, Kobe, Japan

Original No. 3,535,799, dated Oct. 27, 1970, Ser. No. 820,528, Apr. 30, 1969. Application for reissue Dec. 10, 1971, Ser. No. 206,955
Int. Cl. A43b *00/00*
U.S. Cl. 36—2.5 P 4 Claims

Matter enclosed in heavy brackets [ ] appears in the original patent but forms no part of this reissue specification; matter printed in italics indicates the additions made by reissue.

ABSTRACT OF THE DISCLOSURE

A reinforced athletic shoe includes an upper member of woven fabric material, a first reinforcing member joined with the lower peripheral portion of the upper member, and toe and heel reinforcing members joined with the first reinforcing member and upper member. The upper member and the reinforcing members are stitched to a sole which includes upper and lower cloth members made of woven fabric material joined by cement and a bottom member formed of wear-resistent synthetic rubber.

The present invention relates to an improvement in joint portions of athletic shoes to be chiefly used in wrestling, boxing or like sports.

An object of the present invention is to provide athletic shoes having effective joint portions which can fully withstand high compression and tensile forces produced at the joint portions between shoe uppers and shoes during athletic activities and which are therefore free from breakage due to those high compression and tensile forces.

Another important object of the present invention is to provide athletic shoes which are formed with effective reinforcements in the portions most susceptible to breakage so as to avoid the uneconomical use of material.

Still another object of the present invention is to provide athletic shoes which are comfortable to put on and in which the joint portions can be readily formed.

Other objects and advantages of the present invention will become apparent from the following detailed description with reference to the accompanying drawings, in which.

Figure 1:
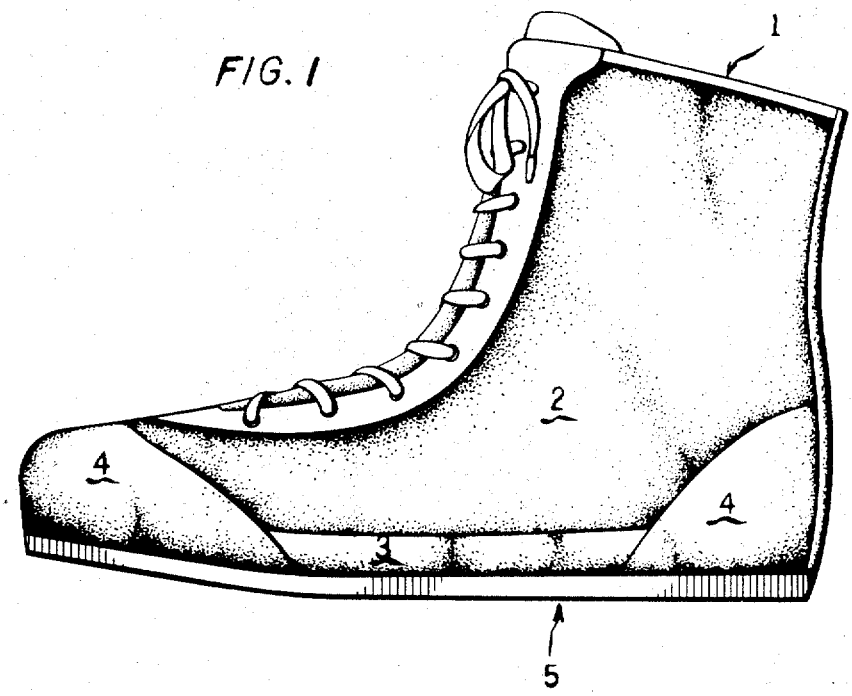
FIG. 1 is a front view showing an athletic shoe of the present invention.
Figure 2:
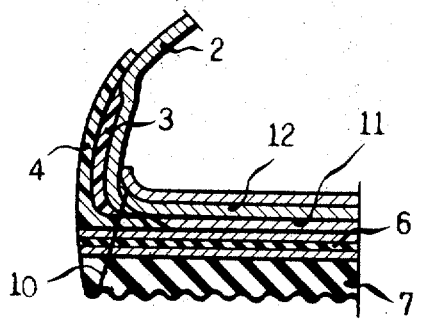
FIG. 2 is an enlarged view in section showing the structure of the principal part of a joint portion in the athletic shoe of the present invention.
Figure 3:
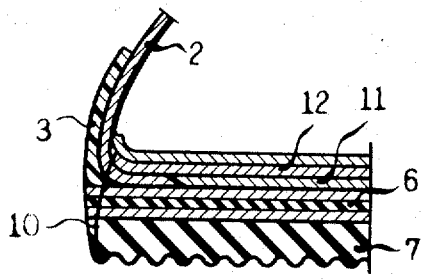
FIG. 3 is an enlarged view in section showing the principal part of a joint portion in the athletic shoe of the present invention.
Figure 4:
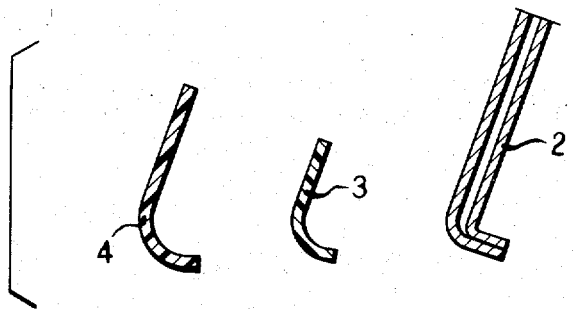
FIG. 4 is a view in section showing an upper in the joint portion of FIG. 2 as it is disassembled.
Figure 5:
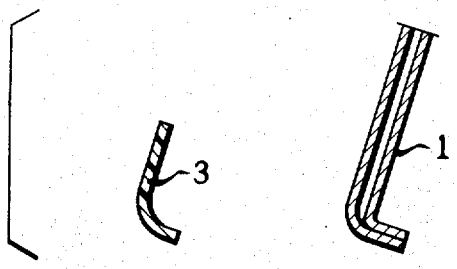
FIG. 5 is a view in section showing an upper in the joint portion of FIG. 3.
Figure 6:
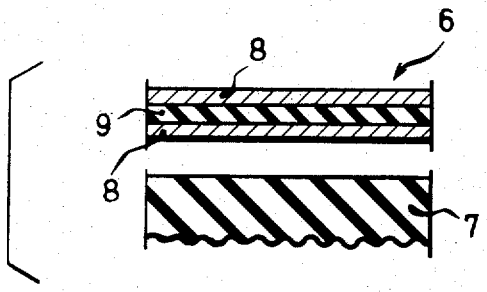
FIG. 6 is a view in section showing the sole as it is disassembled.

Although the athletic shoe of the present invention will be described in detail with respect to an embodiment thereof, the present inventor does not wish to limit the invention only to such embodiment, but it should be understood that the invention also includes various equivalents, modifications, and alterations without departing from the spirit of the inventor and the scope of claims as set forth below.

Designated at 1 is an upper forming the upper portion of an athletic shoe and comprising an upper member 2 for covering the instep, a first reinforcing member 3 for reinforcing the lower peripheral portion of the upper member and a second reinforcing member 4 for reinforcing the first reinforcing member at the toe or heel portion. The upper member 2 is formed of a tough woven cotton fabric such as canvas or of a woven fabric made of synthetic fibers such as polyamide resin fibers, polyester resin fibers, or some other resin material equivalent to these resins fibers. The first reinforcing member 3 is formed of a film or leather made of a synthetic resin which are highly joinable with the upper member 2 such as polyamide resin, polyester resin, polyvinyl chloride resin or the like. Further, the second reinforcing member 4 is to be joined with the external surface of the first reinforcing member 3 around the toe portion and/or heel portion, and is formed of a thick leather, or of a film or leather relatively large in thickness which is made of a synthetic resin such as polyamide resin, polyester or polyvinyl chloride.

Designated at 5 is a sole for forming the under face of the athletic shoe comprising a cover sheet 6 and a rubber sole 7 to be brought into contact with the ground. The cover sheet 6 is formed of pieces of cloth 8 and 8 of a tough cotton fabric like canvas or of a tough woven fabric made of synthetic fibers such as polyamide resin fibers, polyester resin fibers or the like, with a thick rubber cement layer or natural or synthetic rubber piece 9 interposed between the cloth pieces. The rubber sole 7 to be joined with the cover sheet 6 is made of natural or synthetic rubber including wear-resisting material mixed therewith. Applicable as the rubber cement are latex solution, rubber chloride adhesive obtained by reacting natural rubber with chloride, urethane rubber adhesive, chloroprene rubber adhesive, nitrile rubber adhesive, etc.

Enumerated as synthetic rubber are butadiene-styrene rubber (SBR), polybutadiene rubber (PBR), polychloroprene rubber (CR), butadiene-acrylonitrile rubber (NBR), polyurethane rubber, ethylene-propylene rubber, silicone rubber, rubber chloride, etc.

The lower peripheral portion of the upper 1, namely a portion of the first reinforcing member 3 and second reinforcing member 4 are integrally joined with the upper periphery of the sole 5, namely with the cover sheet 6 to form a joint portion of the athletic shoe. In the drawings, designated at 10 is a thread for stitching the upper and the sole together; at 11, sole core; and at 12 an intermediate sole.

The present invention is characterized in the structure of the lower peripheral portion of the upper 1, the upper peripheral portion of the sole 5 and the joint portions of both of these portions.

Since the upper member 2 of the upper in accordance with the present invention is formed of a tough cotton woven fabric such as canvas or of a woven fabric of tough synthetic fibers such as polyamide resin fibers or polyester resin fibers, the upper is capable of satisfactorily withstanding the tension forcibly exerted thereon by the foot of the wearer. However, as compared with other athletic sports, wrestling, boxing or like sport produces such an extremely high tensile force that the lower portion of the upper member 2 is liable to be torn.

Accordingly, to the lower peripheral portion of the upper member 2 is adhered the first reinforcing member 3 made of a synthetic resin film or leather piece having the same quality as the synthetic fibers forming the upper member 2 or the upper member is provided, stitched thereto, with the first reinforcing member 3 made of a synthetic resin film or leather piece which is different from the upper in quality. In addition, around the toe portion or the heel portion of the upper member 2 which is particularly susceptible to great damage or over the external surface of the first reinforcing member 3 corresponding to both of those portions, there is provided an adhesive or stitching engagement therewith, a tough second reinforcing member 4 such as a thick film or leather piece of synthetic resin having the same quality as the first reinforcing member 3 or a thick leather piece. Thus constructed, the athletic shoe is not only capable of withstanding high tension exerted thereon by the wearer's foot and frictional force produced upon contact with a mat or the floor, but the reduction of the service life of the shoe due to the breakage in the upper 1 alone can be precluded.

Because the sole 5 comprises the cover sheet 6 and a rubber sole 7 to be brought into contact with the ground joined therewith, the cover sheet being formed of pieces of cloth 8 and 8 of a tough cotton-fabric like canvas or of a tough woven fabric made of synthetic fibers such as polyamide resin fibers forming the upper member 2 with a thick rubber cement layer or rubber piece 9 interposed therebetween, the rubber sole 7 including wear-resisting synthetic rubber or the like, the sole 5 can withstand compression and tensile forces forcibly exerted thereon against possible breakage. With the damage to the sole 5 thus precluded, the athletic shoe is made serviceable over a remarkably prolonged period.

Further due to the fact that the lower peripheral portion of the upper 1, namely a portion of the first reinforcing member 3 and the second reinforcing member 4 are joined with the upper peripheral portion of the sole 5, namely with the cover sheet 6, or the former and the latter are stitched together after being joined, the joint portions can sufficiently withstand high tensile and compression forces forcibly exerted thereon by the foot of the wearer, the joint portion between the upper periphery of the sole 5 and the lower periphery of the upper 1 thus being perfectly protected against possible destruction. In case, for instance, the first reinforcing member 3 and second reinforcing member 4 on the upper member 2 of the upper 1 and cloth pieces 8, 8 of the cover sheet 6 of the sole 5 are formed with a material of the same quality, the connection at the joint portion can be made further secured. Thus, there is no possible deterioration of adhesion even when the joint portion is subjected to the perspiration exuded from the foot of the wearer. With effective reinforcement provided at the portion which is most susceptible to breakage, economical use of material is ensured to exclude influence on production cost.

It is required that the cloth pieces 8 and 8, upper member 2 of upper 1, first reinforcing member 3, second reinforcing member 4 and the peripheral edge of sole 5 be integrally stitched together with a thread passing therethrough. In this case, the peripheral edge of sole 5 or the lower periphery of upper 1 is cut by the thread which acts to prevent the destruction of the joint portion of sole 5 and upper 1 against the tensile force exerted by the foot of the wearer. In accordance with the present invention, the lower periphery of upper 1, namely a portion of the first reinforcing member 3, and second reinforcing member 4 are joined with the upper periphery of sole 5, namely with the cover sheet 6 or they are stitched together after being joined together, so that the thread is quite unlikely to cut the peripheral edge of the sole or the lower periphery of the upper.

What I claim is:

1. An athletic shoe comprising an upper and a sole, said upper having.

an upper member made of woven fabric material:

a first reinforcing member joined with the outer surface of the lower peripheral portion of said upper member and made of synthetic resin material;

a toe reinforcing member having a lower portion joined with the outer surface of said first reinforcing member and joined with the upper member;

a heel reinforcing member having a lower portion joined with the outer surfaces of said first reinforcing member and an upper portion extending upwardly beyond the first reinforcing member and joined with the upper member, each of the toe and heel reinforcing members being made of synthetic resin material, said sole having upper and lower cloth members made of woven fabric material joined by a cement layer and a bottom member made of wear-resisting synthetic rubber joined with the lower cloth member, first stitch means securing the upper member, the first reinforcing member, the toe reinforcing member and the sole in the toe portion of the shoe, second stitch means securing the upper member, the first reinforcing member, the heel reinforcing member and the sole in the heel portion of the shoe, and third stitch means securing the upper member, the first reinforcing member and the sole along the side portions of the shoe.

2. The shoe of claim 1 in which the toe reinforcing member includes an inwardly extending portion interposed between the lower edge of the upper member and the upper cloth member, the first stitch means passing through said inwardly extending portion of the toe reinforcing member, the heel reinforcing member including an inwardly extending portion interposed between the lower edge of the upper member and the upper cloth member, the second stitch means extending through the inwardly extending portion of the heel reinforcing member.

*3. An athletic shoe comprising an upper and a sole, said upper having*

*an upper member made of woven fabric material;*

*a first reinforcing member joined with the outer surface of the lower peripheral portion of said upper member and made of synthetic resin material;*

*a toe reinforcing member having a lower portion joined with the outer surface of said first reinforcing member and joined with the upper member;*

*a heel reinforcing member having a lower portion joined with the outer surfaces of said first reinforcing member and an upper portion extending upwardly beyond the first reinforcing member and joined with the upper member,*

*said sole having a cover sheet and a bottom member made of wear-resisting synthetic rubber joined with the cover sheet, first stitch means securing the upper member, the first reinforcing member, the toe reinforcing member and the sole in the toe portion of the shoe, second stitch means securing the upper member, the first reinforcing member, the heel reinforcing member and the sole in the heel portion of the shoe, and third stitch means securing the upper member, the first reinforcing member and the sole along the side portions of the shoe.*

*4. An athletic shoe comprising an upper and a sole, said upper having*

*an upper member made of woven fabric material;*

*a first reinforcing member joined with the outer surface of the lower peripheral portion of said upper member and made of synthetic resin material;*

*a toe reinforcing member having a lower portion joined with the outer surface of said first reinforcing member and joined with the upper member;*

*a heel reinforcing member having a lower portion joined with the outer surfaces of said first reinforcing member and an upper portion extending upwardly beyond the first reinforcing member and joined with the upper member,*

*said sole having a cover sheet formed of upper and lower sheets joined by a cement layer and a bottom member made of wear-resisting synthetic rubber joined with the cover sheet, first stitched means securing the upper member, the first reinforcing member, the toe reinforcing member and the sole in the toe portion of the shoe, second stitch means securing the upper member, the first reinforcing member, the heel reinforcing member and*

*the sole in the heel portion of the shoe, and third stitch means securing the upper member, the first reinforcing member and the sole along the side portions of the shoe.*

References Cited

The following references, cited by the Examiner, are of record in the patented file of this patent or the original patent.

UNITED STATES PATENTS

| | | | |
|---|---|---|---|
| 2,586,045 | 2/1952 | Hoza | 36—9 |
| 3,169,326 | 2/1965 | Butera | 36—2.5 |
| 3,416,174 | 12/1968 | Novitske | 39—9 X |

PATRICK D. LAWSON, Primary Examiner